July 2, 1963 J. G. MIKE 3,095,918
PNEUMATIC ANTI-SKID OR SNOW TIRE
Filed Feb. 14, 1962 2 Sheets-Sheet 1
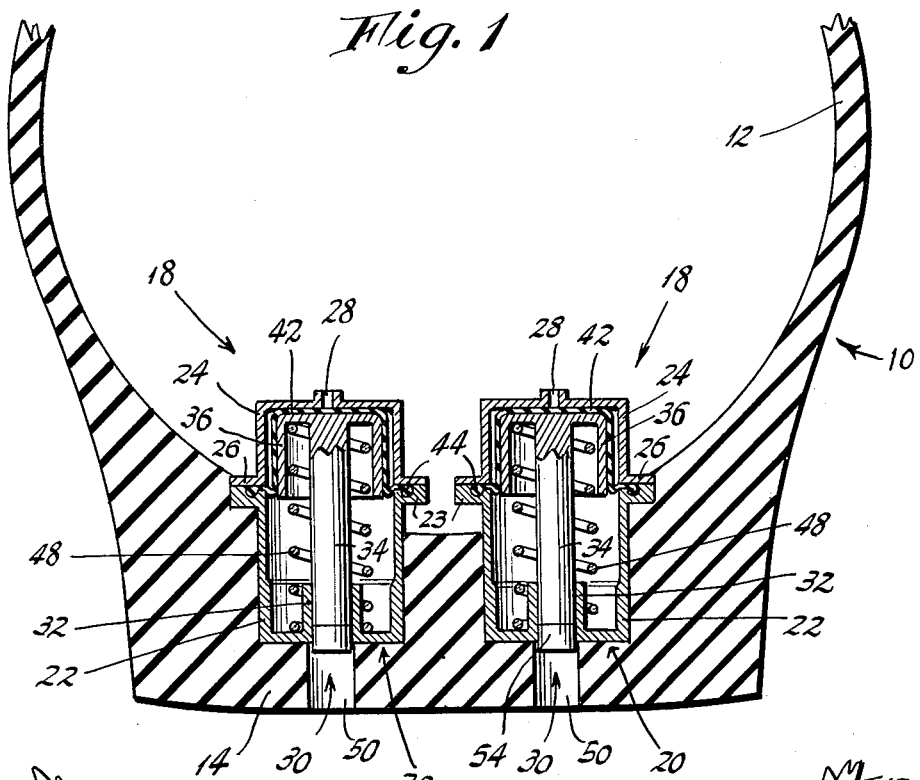
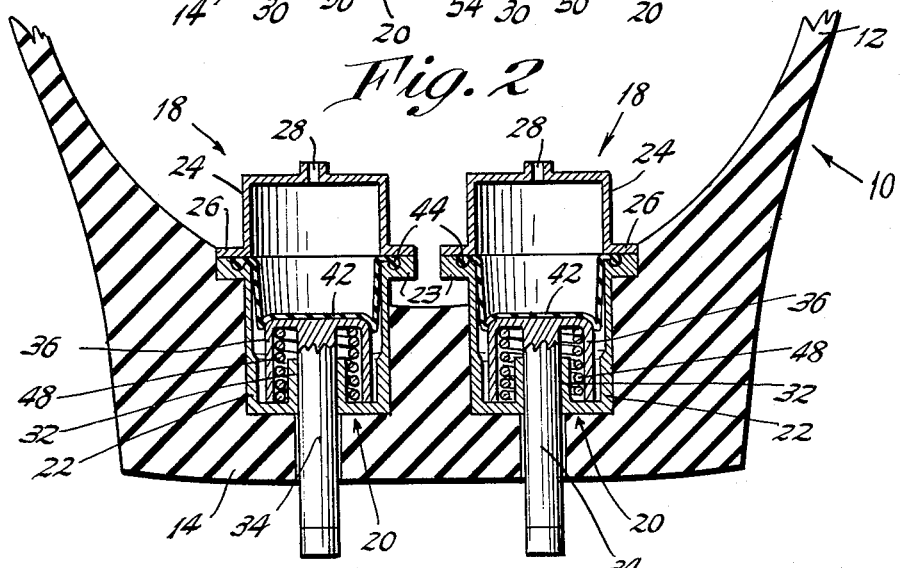
INVENTOR.
John G. Mike
BY
H. Gibner Lehmann
AGENT July 2, 1963 J. G. MIKE 3,095,918
PNEUMATIC ANTI-SKID OR SNOW TIRE
Filed Feb. 14, 1962 2 Sheets-Sheet 2

INVENTOR.
John G. Mike
BY
H. Gibner Lehmann
AGENT 3,095,918
PNEUMATIC ANTI-SKID OR SNOW TIRE
John G. Mike, 71 Elmwood Ave., Bridgeport 5, Conn.
Filed Feb. 14, 1962, Ser. No. 173,248
8 Claims. (Cl. 152—208)

This invention relates to pneumatic tires, and more particularly to tires of this type which have incorporated in their structure a plurality of retracted, normally inoperative anti-skid studs or elements arranged in such a manner that they may be extended and rendered operative when conditions warrant or demand this.

Various tires of the above type have been proposed in the past, incorporating abrasion resistant elements which are projectable from retracted to extended positions to prevent slippage of the tire casing on wet or slippery pavement, or in mud, snow and the like. These proposed devices, however, have in general not been satisfactory for the reason that the structures were complicated and expensive and in the main, impractical. In most instances the prior devices contemplated separate pneumatic systems or lines, which had to be incorporated either in the casing or the rim, or both, and which were intended to be activated or pressurized to effect the extension of the gripping elements. Such separate pneumatic systems were cumbersome and complicated, and involved appreciable expense or cost. They were further impractical from an operating standpoint.

The present invention obviates the drawbacks and disadvantages of prior anti-skid tires of the above type, and one object of the invention is to provide a novel and improved anti-skid tire of the protrudable stud kind, which is especially simple in its construction and practical in operation.

Another object of the invention is to provide an improved non-skid or snow tire as above set forth, which does not require a special pneumatic system of its own but instead makes use of the existing tire pressure and pressure-containing structure of the tire.

A further object of the invention is to provide an improved anti-skid tire in accordance with the foregoing, which does not require appreciable or radical changes in existing tire casings.

Yet another object of the invention is to provide an improved anti-skid tire as characterized, which may be easily rendered operative or inoperative merely by altering the air pressure which maintains the tire itself inflated.

A feature of the invention resides in the provision of an improved non-skid tire as above outlined, wherein there are anti-skid stud assemblages constituting complete individual units each of which is separate from the others and each of which comprises a workable and operative entity which is individually responsive to the tire pressure.

Other features and advantages will hereinafter appear.

In the drawings accompanying this specification, similar characters of reference are used to designate like components, throughout the several views, in which:

FIG. 1 is a transverse sectional view through an anti-skid tire of the tubeless type made in accordance with the invention, the protrudable elements or studs being shown in their retracted positions.

FIG. 2 is a view like that of FIG. 1, but showing the protrudable studs in advanced or extended positions in response to increased air pressure in the tire casing.

Figure 3:
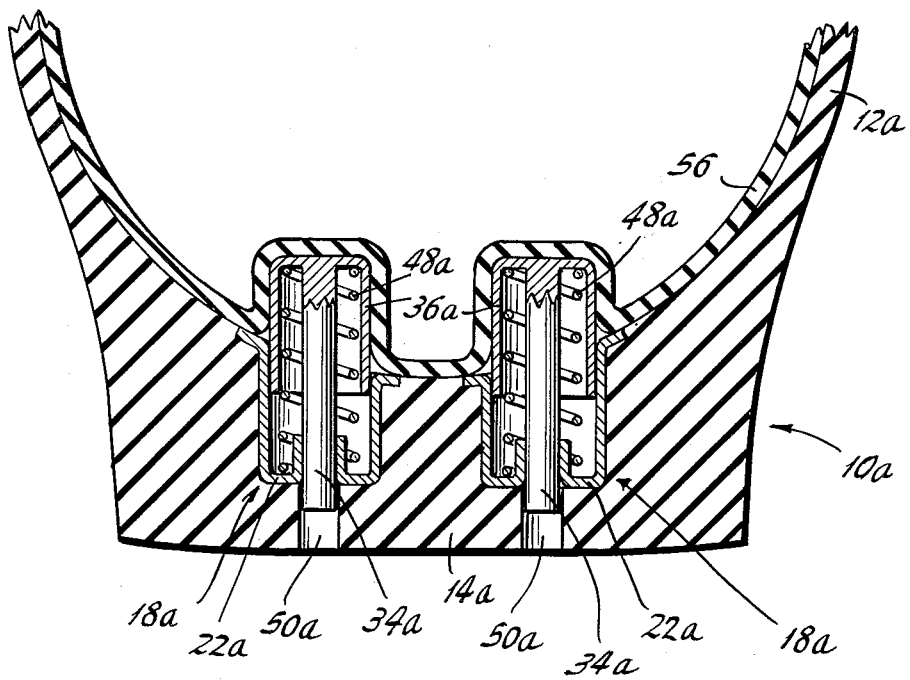
FIG. 3 is a transverse sectional view of a tire casing and inner tube, said casing embodying anti-skid elements as provided by the invention.

Referring first to FIGS. 1 and 2, the tire casing is indicated generally by the numeral 10. The casing 10 has the usual relatively thin and flexible side walls 12, and has a thick peripheral tread portion 14 which is of built-up laminated construction as are the side walls, in accordance with current practice in the tire industry. The tire of FIGS. 1 and 2 is of the tubeless variety, and is mounted on an air-tight rim (not shown) provided with the usual valve stem whereby air may be maintained under pressure within the casing to keep the tire inflated. The wheel rim and valve are not illustrated herein for purposes of simplicity of illustration, and for the reason that these components are well known in the art and as such per se form no part of the present invention.

In accordance with this invention, the tread portion 14 of the tire casing 10 comprises part of a novel assemblage which includes a plurality of retractable and extendable anti-skid elements or studs which are actuated as a function of the tire pressure, that is, the air pressure within the casing 10. No separate or independent pneumatic systems whatsoever are required or involved in order to effect extension or retraction of the anti-skid elements, but instead as provided by the invention these elements are retained in retracted or non-protruding positions when the tire pressure is in a normal range, and are extended to protruding, operative positions when additional air is pumped into the tire to increase the pressure a certain, fairly appreciable extent.

In accordance with the invention, the various extendable and retractable anti-skid elements are each independent one from the other, all of said elements being preferably duplicates of each other and working independently but generally in unison in a manner determined by the air pressure within the tire. The number of anti-skid elements may be chosen to provide the most desirable anti-skid qualities for various conditions, for example, travel over snow, ice, through mud, etc. Also the particular disposition or arrangement of the independent elements or assemblages in the tread portion 14 may be varied. As shown in FIGS. 1 and 2 the individual anti-skid elements, which are indicated generally by the numeral 18, are arranged in two rows or columns extending circumferentially around the tire, the elements 18 at any one point being two abreast as illustrated. However, either a larger or a lesser number of such elements 18 may be provided in the tire tread portion, to suit the various requirements of use.

Each of the anti-skid elements 18 is further so arranged that, while it has a plunger action involving piston-and-cylinder-like components, there is always effected a perfect seal which is entirely leakproof, thereby to assure against loss of air from the casing 10 under all conditions of use. The assemblages 18, while having the above characteristic, may be fabricated in various manners; one typical and practical construction is illustrated in FIGS. 1 and 2. As shown here, each of the anti-skid elements 18 comprises a two part housing or casing 20 having an outer cup-shaped portion 22 which is imbedded and securely anchored in the tread 14 of the casing 10 and which has a flanged rim 23. The housings 20 also have complementary cover portions 24 of cup-like configuration, provided with flanged rims 26 which are secured to the flanged rims 23 of the anchorage portions 22. The cover or closure portions 24 have vent openings 28 by which communication is established between the interior space in the casing 10 and the interior space in the housing 20.

The anti-skid elements 18 further comprise plunger or stud components 30 which are slidably carried in sleeve bearings 32 preferably formed as integral parts of the housing portions 22 and arranged at the center of the bottom walls of such housing portions. The plungers 30 comprise shanks 34 which extend axially in the housings 20 and carry at their inner ends enlarged cup-like formations or heads 36 very much in the form of pistons. In this connection, the housings 22 may be likened to cylinders having a cooperable relationship with the piston-like heads 36.

The anti-skid elements 18 further comprise hermetic diaphragm elements 42 which also preferably have a cup-like configuration with the rim portions 44 thereof sealed between the flanges 23 and 26 of the housings 20. Such rim portions 44 may be formed with thickened edges, as shown, which are received in annular grooves in the flanges 23, the arrangement being such that upon two housing portions 22 and 24 being secured together at the flanges 23 and 26 there will be effected an air-tight connection between the rim 44 of the diaphragm 42 and the inner walls of the housing 20. Thus, each housing is actually divided into two compartments by the diaphragm 42, each such compartment being sealed in air tight manner from the other.

The plunger 30 of each assemblage 18 is further normally retained in the retracted position shown in FIG. 1 by helical compression spring 48 engaged under the head formation 36 and also with the bottom wall of the housing part 22.

The tread portion 14 of the tire casing is provided with openings 50 through which the plunger shanks 48 may project, as shown in FIG. 2. Such projection is effected by air of increased pressure within the casing 10. For example, each helical retracting spring 48 may be so constituted that it normally retains the plunger shank 48 retracted for a tire or air pressure of 18 pounds per square inch, and when such air pressure is increased to 35 pounds per square inch the shanks or plunger members 18 will be fully extended, as illustrated in FIG. 2.

It will be noted that the diaphragms 42 function to transmit the pressure of the air within the casing 10 to the heads or piston members 36 of the anti-skid assemblages while at the same time positively preventing leakage of air from the casing past the said anti-skid assemblages. Since the diaphragms 42 are hermetically sealed and secured to the flange portions 23, 26 of the housings 20, no air can escape past the diaphragms at the insides of said housings. Also, by proper securement and bonding of the housings 22 to the tread portion 14 of the casing 10 there is prevented any leakage of air past the exterior of the housings 22 and out through the openings 50 provided for the plungers or studs 34.

It will be understood that intermediate pressures in the range between 18 and 35 pounds per square inch will result in intermediate positions of the studs 34. Thus, certain of such intermediate pressures will effect only a partial extension of the studs whereby these may, for example, be positioned flush with the external or peripheral surface of the tread portion 14.

It will now be readily apparent that when the tire has the normal relatively low air pressure of 18 pounds or so per square inch, all of the studs 34 will be retracted, and these will have no anti-skid function. The tire will operate in the well known manner of conventional pneumatic tires having ordinary rubber treads. At the time that it is desired to make use of the anti-skid elements of the tire the user merely has more air pumped into it, up to approximately 35 pounds per square inch whereby the anti-skid plunger elements will be automatically extended to the operative positions as illustrated in FIG. 2. After the need for the anti-skid elements has passed the user need merely bleed sufficient air from the tire to enable the retracting springs 48 to effect retraction of the studs 34 whereupon the tire will again function as an ordinary pneumatic casing devoid of anti-skid elements.

It will be noted that the act of rendering operative or inoperative the anti-skid elements is thus merely as simple as filling air into a tire or removing some of the air. Further, such simple operation of the anti-skid elements is had without involving separate or complicated pneumatic systems or the like, or without unduly changing the structure of the steel rim, casing side walls, etc. The main change in the tire casing involves the imbedding of the individual anti-skid units or assemblages 18 in the tread portion of the tire, and this may be readily effected at the time of fabrication, without requiring complicated equipment or manufacturing techniques. If desired, removable tips 54 of material such as tungsten carbide which is especially formulated to be abrasion-resistant, may be used on the plunger members 34 to provide these with a longer useful life.

Another embodiment of the invention is illustrated in FIG. 3, wherein there is shown a tire construction of the type utilizing an inner tube. In this figure, the tire casing 10a having the tread portion 14a and side walls 12a, carries a conventional type of inner tube 56. Anti-skid assemblages 18a are provided in the tread portions 14a of the tire, the said assemblages comprising cup-shaped housing portions 22a slidably carrying plunger or stud components 34a having cup-shaped heads or enlargements 36a. The anti-skid assemblages 18a include helical compression retracting springs 48a engaged under the head portions 36a and also engaged with the bottom walls of the housing portions 22a. The head enlargements 36a directly engage the conventional inner tube 56 of the tire, as illustrated. With this modification it is not necessary for the anti-skid assemblages 18a to be air tight or to make or effect an hermetic seal with the tread 14a of the tire, inasmuch as the tire pressure is wholly contained by the air-tight inner tube 56.

The embodiment of FIG. 3 is thus seen to be also responsive to the tire pressure. That is, when the air pressure in the inner tube 56 is relatively low as for example on the order of 18 pounds per square inch, the plunger components 34a will be in their retracted positions as illustrated. However, when air is filled into the tire to bring up the pressure in the tube to a value in the range of 35 pounds per square inch, the plunger elements 34a will be fully retracted, protruding or projecting from the tread portions 14a and constituting effective anti-skid means for preventing slippage of the tire in snow, mud or on ice or the like.

It will be noted that in each instance the anti-skid elements operate individually and are separate from each other, and further may be virtual duplicates of each other. Also, they will be responsive to the tire pressures and the retracted or extended positions of said elements may be readily effected by merely adding air to the tire or else removing some air.

Additionally, in each instance the required alteration of the tire casing involves the imbedment of the anti-skid elements in the tread portion, and no changes are required in the tire side walls nor in the wheel rim, tire valve stem, etc. While the exterior surfaces of the housing portions 22 and 22a are illustrated in the figures as being relatively smooth, it will be understood that knurling, protrudences or the like may be provided on the housing exteriors to effect a more secure anchorage and bonding of the same to the material of the tread portions 14 or 14a.

Variations and modifications may be made within the scope of the claims, and portions of the improvements may be used without others.

I claim:

1. A pneumatic anti-skid vehicle tire comprising, in combination:

(a) a tire casing having a peripheral tread portion, (b) a plurality of anti-skid plungers mounted in said tread portion for substantially radial movement between retracted, non-protruding positions and extended positions wherein they project from the tread portion to increase the traction of the tire, (c) yieldable means biasing the said plungers to their retracted positions and normally retaining the plungers therein when air pressure in the casing is below a predetermined value; and (d) means comprising an enclosure having a volume commensurate with that of the casing and including any air-tight, flexible member in the casing, operable by the pressurized air therein, for shifting the said plungers to their extended positions when the air pressure in the casing is raised appreciably above said predetermined value.

2. An anti-skid tire as in claim 1, wherein:
(a) the said air-tight flexible member comprises a plurality of diaphragms sealingly connected respectively to areas of the casing surrounding the inner ends of the plungers.

3. An anti-skid tire as in claim 2 and further including:
(a) housings imbedded in and secured to the tread portion and slidably mounting the said plungers, and
(b) means attaching the said diaphragms to the interiors of the housings to overlie the inner ends of the plungers, said housings being sealed to areas of the tread portion which surround the plungers.

4. An anti-skid tire as in claim 1, wherein:
(a) the said air-tight flexible member comprises the inner tube of the tire.

5. An anti-skid tire as in claim 1, wherein:
(a) the plungers comprise shank portions projectable from the tread portion and enlarged heads engageable with the said flexible means and adapted to have force exerted on them by said means.

6. An anti-skid tire as in claim 1, wherein:
(a) the plungers are arranged in rows extending transversely of the tread portion of the tire.

7. An anti-skid tire as in claim 1, wherein the plungers have removable outer tips constituted of a material especially formulated to resist abrasion.

8. A pneumatic anti-skid vehicle tire comprising, in combination:
(a) a tire casing having a peripheral tread portion,
(b) a plurality of anti-skid plungers mounted in said tread portion for substantially radial movement between retracted, non-protruding positions and extended positions wherein they project from the tread portion to increase the traction of the tire,
(c) yieldable means biasing the said plungers to their retracted positions and normally retaining the plungers therein when air pressure in the casing is below a predetermined value; and
(d) means comprising an enclosure having a volume commensurate with that of the casing and including an air-tight, flexible member in the casing, operable by the pressurized air therein, for shifting the said plungers to their extended positions when the air pressure in the casing is changed appreciably from said predetermined value.

References Cited in the file of this patent
UNITED STATES PATENTS

| | | |
|---|---|---|
| 2,652,876 | Eisner | Sept. 22, 1952 |
| 2,841,199 | Voelkel et al. | July 1, 1958 |
| 2,888,056 | Zahlten | May 26, 1959 |

FOREIGN PATENTS

| | | |
|---|---|---|
| 494,461 | Italy | May 25, 1954 |